United States Patent [19]

Hirzel

[11] Patent Number: 5,167,070
[45] Date of Patent: Dec. 1, 1992

[54] WHIP/FORK FOR NOODLE EATING/SERVING UTENSIL

[76] Inventor: Suzy C. Hirzel, 933 Shellwood Way, Sacramento, Calif. 95831

[21] Appl. No.: 747,340

[22] Filed: Aug. 20, 1991

[51] Int. Cl.$^5$ ............................................. A47J 43/28
[52] U.S. Cl. ...................................... 30/322; D7/653
[58] Field of Search ............... 30/322, 323, 137, 147, 30/148, 150; D7/653

[56] References Cited

U.S. PATENT DOCUMENTS

| | | | |
|---|---|---|---|
| 2,664,630 | 1/1954 | Lawson | 30/322 |
| 2,748,479 | 6/1956 | Levine | 30/322 |
| 2,853,779 | 9/1958 | Lordo | 30/322 |
| 3,138,871 | 6/1964 | Sears | 30/322 |
| 3,552,017 | 1/1971 | Smuts | 30/322 |
| 3,609,865 | 10/1971 | Golden | 30/322 |
| 5,005,293 | 4/1991 | Di Amico | 30/322 |

FOREIGN PATENT DOCUMENTS 1142636 4/1957 France ....................... 30/322

Primary Examiner—Douglas D. Watts
Assistant Examiner—Hwei-Siu Payer

[57] ABSTRACT

A combination "whip/fork" for serving noodles and mixing ingredients, which is a hand held device, comprised of a base having an outer row of tines which is located around the edge of the base radially extending slightly, additional rows of tines of varying lengths are positioned within the circumference of the outer row of tines, base is attached to a generally vertical handle element, when tines are inserted into a pile of noodles the noodles are secured across and around the row of tines, also device can be used as a whip to mix ingredients.

4 Claims, 1 Drawing Sheet

WHIP/FORK FOR NOODLE EATING/SERVING UTENSIL

BACKGROUND ART

1. Field of Invention

This invention relates to a kitchen accessory, especially noodle serving utensil/fork, and also serving as a whipping utensil.

2. Description of the Prior Art

Use of a fork when eating spaghetti requires a spinning motion to wind the spaghetti around the fork. Use of a fork requires several spins for the noodle to attach to the fork. These motions are difficult, because the existing forks are flat and have a single row of tines. Most of the time the noodles will fall from the fork. Most Italian restaurants provide their customer bibs to protect their clothes from spaghetti noodle and sauce stains. Reducing the number of rotations and grabbing more noodles at the same time on the fork will eliminate the mess and would save time.

Often, a fork is used to whip eggs, gravies, etc. Most forks are flat and not as well suited as the common kitchen whip. No prior art is available that meets this serving utensil/whip/fork combination, which has a rounded whipping/serving end.

Most conventional whips are made of a series of wires shaped in independent closed loops which cannot be used as a grabbing utensil and are difficult to clean between the crossed loops. Also, these wire loops are not flexible enough to access hard to reach corners.

There remains a need for an improved, versatile utensil that can be used for multiple functions such as whipping, mixing, serving, etc. Also, the utensil should be inexpensive, simple to operate, durable, efficient in performing the above mentioned functions, and easy to clean.

SUMMARY OF THE INVENTION

The improved whip/serving utensil/noodle fork (herein referred to as "whip/fork") of the present invention satisfies all the foregoing needs. The "whip/fork" is substantially set forth in the abstract. The "whip/fork" head, which is constructed with elongated tines (outer row of tines) vertically extending from the horizontal stationary base. The generally round or oval base having upper and lower panels. The base may have additional rows of tines (inner row of tines) positioned within the circumference of the outer row of tines. These inner row(s) of tines are generally longer toward the center of the circumference of the outer row of tines. The tips of these tines will create a generally rounded contour intended to allow the "whip/fork" to access hard to reach areas, including the bottom of the bowl.

The vertical handle is connected to the lower panel of the stationary base. The present invention also can be used for serving shredded vegetables, and especially great for slippery oriental noodles. Most efficient tines lengths would range from approximately 1½ inch to 3 inches. Ideally, the base would be generally rounded or oval shaped, however, rectangular, square, triangular, or other various shapes are feasible. Diameter of the outer row of tines determines the quantity of noodles it is capable of serving. The diameter of the base could range from ½ inch to 2 inches.

The space between the tines should be narrow enough to grab the noodles but wide enough for easy insertion/removal, and not to severely damage the noodles. Spacing between the tines should be no less than 3/32 inch and no wider than 1 inch (depending on the diameter of the stationary base.)

The "whip/fork" can be used as a serving and/or eating utensil.

The base and tines can be made separately from the handle or made in one unit of the below listed materials or a combination of these materials. The components of this device can be made of wood, hard rubber, plastic, or metal. Also, material should be able to resist the hot temperature of cooked/cooking food.

DETAILED DESCRIPTION

Figure 1:
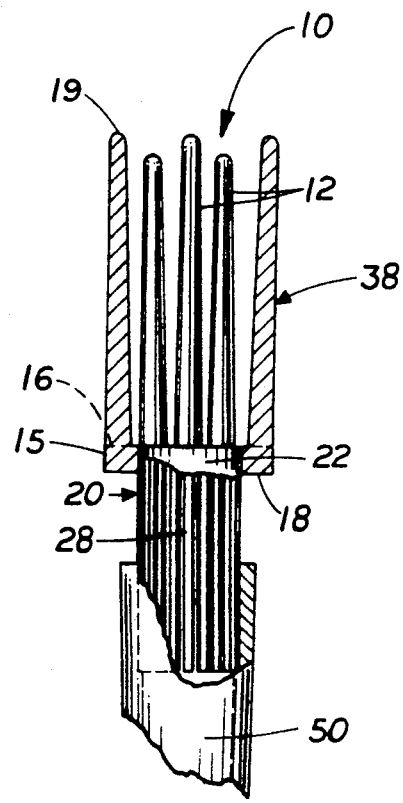
FIG. 1: is a side cross-section view of the first embodiment of the "whip/fork".
Figure 2:
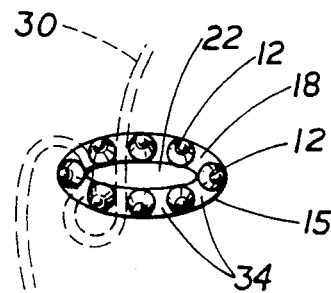
FIG. 2: is a top view of the first embodiment of the "whip/fork" showing with noodle crossing tine to tine.
Figure 3:
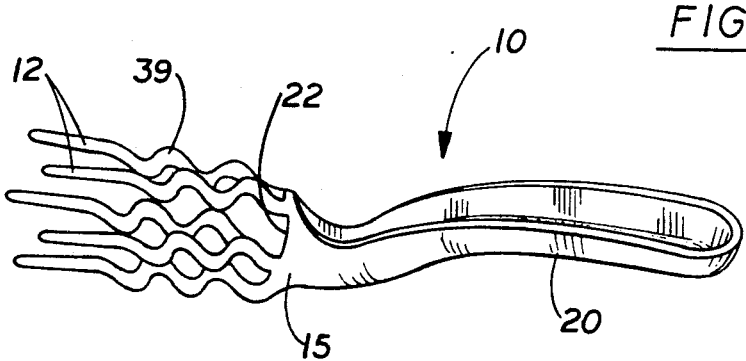
FIG. 3: is a perspective side view of the first embodiment of the "whip/fork" with angled handle.

FIGS. 1, 2, and 3

Referring more particularly to FIGS. 1, 2, and 3 embodiment of the "whip/fork" of the present invention is schematically depicted therein, thus 10 is shown, which is comprised of head 38 and handle 20. Head 38 is comprised of a horizontal generally oval shaped base 15, base 15 having upper panel 16 and lower panel 18, a minimum of five elongated tines 12 are extending radially from upper panel 16. Generally vertical handle 20 is attached to lower panel 18.

The tines 12 are approximately 1¼ inch to 3 inches long and may be varied length, alternated. This method will create wider space at the upper area between the tines (FIG. 1) for easy insertion to noodles. The shape of tine-base can be round, rectangular, oval or any other shape (FIG. 2). Tines 12 may have wavy structure 39 for additional securing the noodles. The tine tips 19 should be rounded or tapered to prevent personal injury or damaging the mixing bowl or foodstuff. If the base 15 and tines 12 are injection molded, tines 12 should be thicker near the base 15 and thinner at the tip 19 for easier removal from the injection mold. The space 34 between the tines are wide enough not to crush the noodles 30 (FIG. 2).

The base 15 has hollow cavity 22 to prevent shrinkage problems during the injection molding process and also to save material. Handle 20 may have vertical serration 28. Vertical serration 28 is helpful when rotating the device 10. Handle 20 may have non-slip cover 50. Handle 20 can be inserted and/or connected into cavity 22, or injection molded in one piece with head 38. Handle 20 may be slightly contoured to accommodate users' hand to be comfortable when using the device (FIG. 3).

FIG. 4

Figure 4:
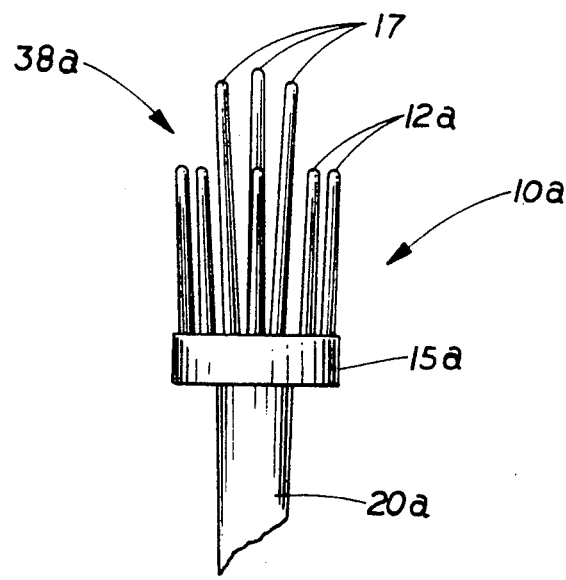
FIG. 4: is a side view of the head (top) and part of the handle of the second embodiment of the "whip/fork".

A second preferred embodiment of the "whip/fork" is shown in FIG. 4. "Whip/Fork" 10a is similar to 10 and bear the same numerals, and are succeeded by the letter "a", except for new numerals.

The base having additional row(s) of tines, these inner row(s) of tines 17 are positioned within the circumference of the outer row of tines 12a and are longer than tines 12a. These inner row(s) of tines 17 are generally longer toward the center of the circumference than the outer row of tines 12a. The tines 12a and 17 which are made of a flexible plastic material and are radially extended outward toward the tips 19a. This method will allow for more materials (tempura batter, pancake mix, etc.) to be mixed in a shorter period of time. Also, more noodles can be rolled on the "whip/fork" while the device prevents the noodles from slipping off. Also, this method will form a generally rounded contour shaped head 38a. Rounded contour shaped head 38a will be ideal when using rounded mixing bowls. Additionally, the flexible tines 12a and 17 are ideal for accessing hard to reach corners of mixing containers. However, tines 12/17 can be angled, bent, inwarded or outwarded depending on the handle angle.

Various modifications, changes, alterations, and additions can be made in the improved "whip/fork" of the present invention, its components and their parameters. All such modifications, changes, alterations and additions as are within the scope of the appended claims form part of the present invention.

What is claimed is:

1. A "whip/fork" combination comprising:
    a head and a holding element, said head comprising a horizontal base having an upper panel and a lower panel, and tines generally extending vertically away from said upper panel in a circle within the periphery of the base, said tines having at least five tines, said tines having upper rounded tine tips and lower tine ends, said and a first predetermined length;
    said holding element generally extending vertically away from said lower panel, said base having additional tines located within the periphery of said base, said additional tines having a second predetermined length different from said first predetermined length.

2. The "whip/fork" of claim 1, wherein said tines, base, and holding element are made in one piece and injection molded.

3. The "whip/fork" of claim 1, wherein said tines are tapered outwardly from a vertical plane as said tines extend from said lower tine ends to said upper tine tips.

4. The "whip/fork" of claim 1, wherein said holding element is rounded with vertical serrations for easy manipulation.

* * * * *